(12) United States Patent
LaBossiere et al.

(10) Patent No.: US 7,384,255 B2
(45) Date of Patent: Jun. 10, 2008

(54) RAPID PROTOTYPING SYSTEM WITH CONTROLLED MATERIAL FEEDSTOCK

(75) Inventors: Joseph Edward LaBossiere, Roger, MN (US); Marvin E. Eshelman, Moundsview, MN (US)

(73) Assignee: Stratasys, Inc., Eden Prairie, MN (US)

( * ) Notice: Subject to any disclaimer, the term of this patent is extended or adjusted under 35 U.S.C. 154(b) by 293 days.

(21) Appl. No.: 11/173,446

(22) Filed: Jul. 1, 2005

(65) Prior Publication Data

US 2007/0003656 A1 Jan. 4, 2007

(51) Int. Cl.
*B28B 17/00* (2006.01)

(52) U.S. Cl. ............... 425/190; 425/182; 425/375; 226/187

(58) Field of Classification Search ........... 425/182, 425/190, 375, 376.1; 226/187
See application file for complete search history.

(56) References Cited

U.S. PATENT DOCUMENTS

| | | | |
|---|---|---|---|
| 3,016,451 A | 1/1962 | Cornell | |
| 3,381,812 A | 5/1968 | Cohen | |
| 3,841,000 A | 10/1974 | Simon | |
| 4,152,367 A | 5/1979 | Binsack et al. | |
| 4,665,492 A | 5/1987 | Masters | |
| 4,749,347 A | 6/1988 | Valavaara | |
| 4,844,373 A | 7/1989 | Fike, Sr. | |
| 4,928,897 A | 5/1990 | Satou et al. | |
| 4,961,154 A | 10/1990 | Pomerantz et al. | |
| 5,169,081 A | 12/1992 | Goedderz | |
| 5,257,657 A | 11/1993 | Gore | |
| 5,263,585 A | 11/1993 | Lawhon et al. | |
| 5,293,996 A | 3/1994 | Duncan | |
| 5,303,141 A | 4/1994 | Batchelder et al. | |
| 5,312,224 A | 5/1994 | Batchelder et al. | |
| 5,340,433 A | 8/1994 | Crump | |
| 5,402,351 A | 3/1995 | Batchelder et al. | |
| 5,474,719 A | 12/1995 | Fan et al. | |
| 5,503,785 A | 4/1996 | Crump et al. | |
| 5,578,227 A | 11/1996 | Rabinovich | |
| 5,587,913 A | 12/1996 | Abrams et al. | |
| 5,633,021 A | 5/1997 | Brown et al. | |
| 5,637,175 A | 6/1997 | Feygin et al. | |
| 5,695,707 A | 12/1997 | Almquist et al. | |
| 5,738,817 A | 4/1998 | Danforth et al. | |
| 5,764,521 A | 6/1998 | Batchelder et al. | |
| 5,816,466 A * | 10/1998 | Seufer | 226/187 |

(Continued)

FOREIGN PATENT DOCUMENTS

| | | |
|---|---|---|
| WO | WO 00/62994 | 10/2000 |
| WO | WO 02/06029 | 1/2002 |
| WO | WO 02/093360 | 11/2002 |
| WO | WO 2004/003823 | 8/2004 |

*Primary Examiner*—Robert B. Davis
*Assistant Examiner*—Maria Veronica D Ewald
(74) *Attorney, Agent, or Firm*—Kinney & Lange, P.A.

(57) ABSTRACT

A deposition modeling system incorporates a drive mechanism to feed a strand of filament to create a model. The drive mechanism comprises a pivot block that is rotatably connected to a fixed block and a motor that rotates a drive shaft. A drive roller is connected to the drive shaft and an idler roller is connected to an idler axle that extends from the pivot block in a substantially perpendicular direction to the direction of rotation of the pivot block with respect to the fixed block and in a substantially parallel direction to the drive shaft.

20 Claims, 8 Drawing Sheets

U.S. PATENT DOCUMENTS

| | | |
|---|---|---|
| 5,866,058 A | 2/1999 | Batchelder et al. |
| 5,868,296 A * | 2/1999 | Gentile et al. ............... 226/35 |
| 5,893,404 A | 4/1999 | Mendez et al. |
| 5,900,207 A | 5/1999 | Danforth et al. |
| 5,932,055 A | 8/1999 | Newell et al. |
| 5,936,861 A | 8/1999 | Jang et al. |
| 5,943,235 A | 8/1999 | Earl et al. |
| 5,968,561 A | 10/1999 | Batchelder et al. |
| 6,004,124 A | 12/1999 | Swanson et al. |
| 6,041,991 A * | 3/2000 | Mehri et al. ............... 226/177 |
| 6,054,077 A | 4/2000 | Comb et al. |
| 6,070,107 A | 5/2000 | Lombardi et al. |
| 6,085,957 A | 7/2000 | Zinniel et al. |
| 6,119,567 A | 9/2000 | Schindler et al. |
| 6,127,492 A | 10/2000 | Nagashima et al. |
| 6,129,872 A | 10/2000 | Jang |
| 6,162,378 A | 12/2000 | Bedal et al. |
| 6,165,406 A | 12/2000 | Jang et al. |
| 6,193,923 B1 | 2/2001 | Leyden et al. |
| 6,214,279 B1 | 4/2001 | Yang et al. |
| 6,228,923 B1 | 5/2001 | Lombardi et al. |
| 6,257,517 B1 | 7/2001 | Babish et al. |
| 6,261,077 B1 | 7/2001 | Bishop et al. |
| 6,322,728 B1 | 11/2001 | Brodkin et al. |
| 6,557,742 B1 | 5/2003 | Bobeczko et al. |
| 6,572,228 B2 | 6/2003 | Kaga et al. |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,776,602 B2 | 8/2004 | Swanson et al. |
| 6,814,907 B1 | 11/2004 | Comb |
| 6,866,807 B2 | 3/2005 | Comb et al. |
| 6,923,634 B2 | 8/2005 | Swanson et al. |
| 7,026,574 B2 * | 4/2006 | Belfiore et al. ........... 219/137.7 |

* cited by examiner

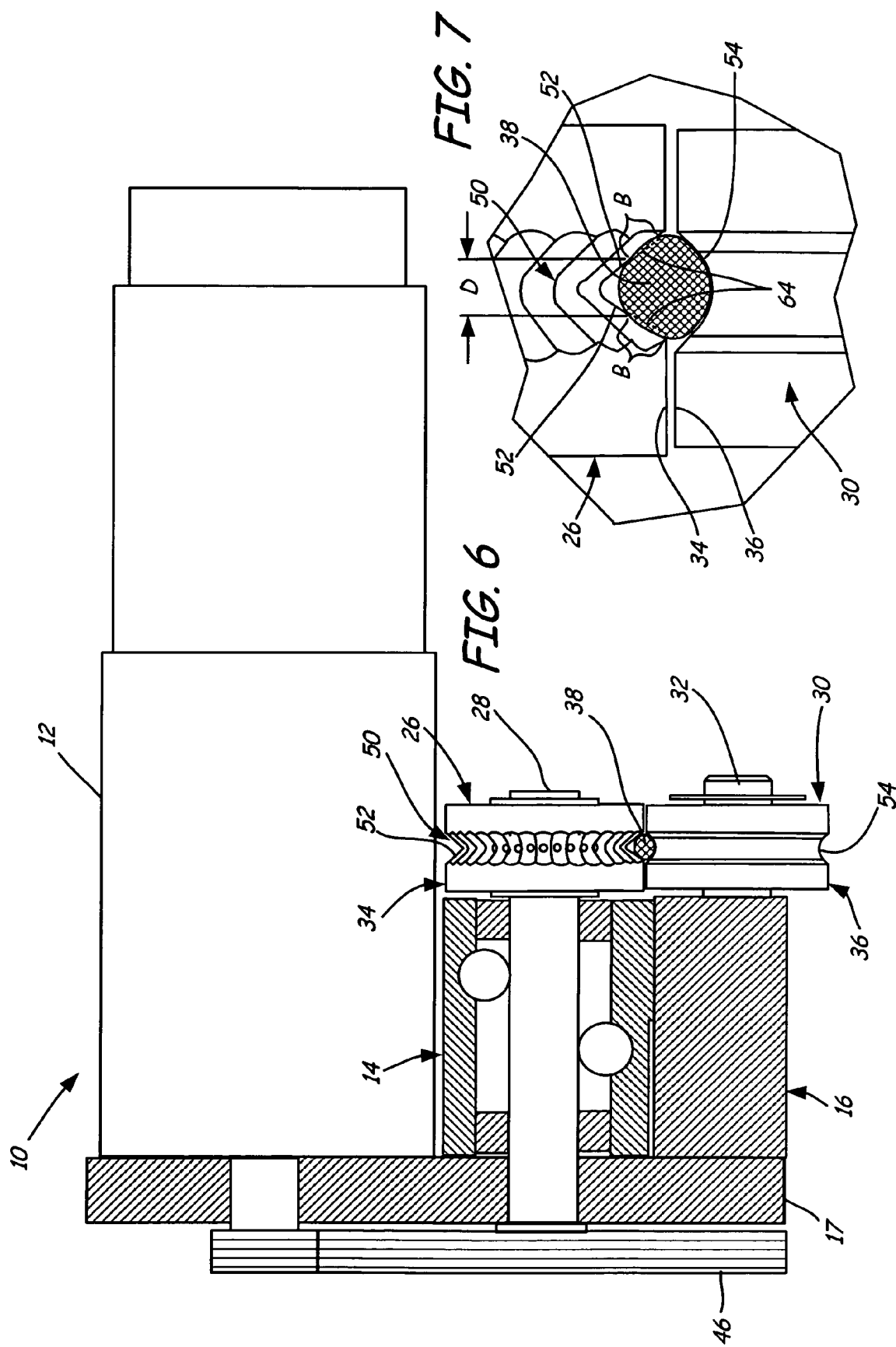

RAPID PROTOTYPING SYSTEM WITH CONTROLLED MATERIAL FEEDSTOCK

CROSS-REFERENCE TO RELATED APPLICATION(S)

None.

BACKGROUND OF THE INVENTION

This invention relates to the fabrication of three-dimensional objects using extrusion-based layered manufacturing techniques. More particularly, the invention relates to a deposition modeling system utilizing a feed drive mechanism that accommodates filament having various diameters, more effectively controls movement of the filament and is easier to service and repair.

Three-dimensional models are used for functions including aesthetic judgments, proofing a mathematical computer aided design (CAD) model, forming hard tooling, studying interference and space allocation, and testing functionality. Extrusion-based layered manufacturing machines build up three-dimensional models by extruding solidifiable modeling material from an extrusion head in a predetermined pattern, based upon design data provided from a CAD system. A feedstock of either a liquid or solid modeling material is supplied to the extrusion head. One technique is to supply modeling material in the form of a filament strand. Where the feedstock of modeling material is in solid form, a liquifier brings the feedstock to a flowable temperature for deposition.

Examples of extrusion-based apparatus and methods for making three-dimensional objects are described in Valavaara U.S. Pat. No. 4,749,347, Crump U.S. Pat. No. 5,121,329, Crump U.S. Pat. No. 5,340,433, Crump et al. U.S. Pat. No. 5,503,785, Danforth, et al. U.S. Pat. No. 5,900,207, Batchelder, et al. U.S. Pat. No. 5,764,521, Batchelder, et al. U.S. Pat. No. 5,968,561, Dahlin, et al. U.S. Pat. No. 6,022,207, Stuffle et al. U.S. Pat. No. 6,067,480 and Batchelder, et al. U.S. Pat. No. 6,085,957, all of which are assigned to Stratasys, Inc., the assignee of the present invention.

In the modeling machines employing a filament feed, modeling material is loaded into the machine as a flexible filament wound on a supply reel, such as disclosed in U.S. Pat. No. 5,121,329. A solidifiable material which adheres to the previous layer with an adequate bond upon solidification and which can be supplied as a flexible filament is used as the modeling material. The extrusion head, which includes a liquifier and a dispensing nozzle, receives the filament, melts the filament in the liquifier, and extrudes molten modeling material from the nozzle onto a base contained within a build envelope. The modeling material is extruded layer-by-layer in areas defined from the CAD model. The material being extruded fuses to previously deposited material and solidifies to form a three-dimensional object resembling the CAD model. In building a model from a modeling material that thermally solidifies upon a drop in temperature, the build envelope is preferably a chamber which is heated to a temperature just below the solidification temperature of the modeling material during deposition, and then gradually cooled to relieve stresses from the material. As disclosed in U.S. Pat. No. 5,866,058, this approach anneals stresses out of the model while it is being built so that the finished model is stress free and has very little distortion.

In creating three-dimensional objects by depositing layers of solidifiable material, supporting layers or structures are built underneath overhanging portions or in cavities of objects that are under construction and are not supported by the modeling material itself. For example, if the object is a model of the interior of a subterranean cave and the cave prototype is constructed from the floor towards the ceiling, then a stalactite will require a temporary support until the ceiling is completed. A support structure may be built utilizing the same deposition techniques and apparatus by which the modeling material is deposited. The apparatus, under appropriate software control, produces additional geometry acting as a support structure for the overhanging or free-space segments of the object being formed. Support material is deposited either from a separate dispensing head within the modeling apparatus, or by the same dispensing head that deposits modeling material. A support material is chosen that will adhere to the modeling material during construction, and that is removable from a completed object. Various combinations of modeling and support materials are known, such as are disclosed in U.S. Pat. No. 5,503,785.

In Stratasys FDM® three-dimensional modeling machines of the current art which embody a filament feed as disclosed in the above-referenced patents, a coil of modeling filament wrapped on a spool is loaded into the machine by mounting the spool onto a spindle. The filament is made of a thermoplastic or wax material. The user may manually feed a strand of the filament through a guide tube made of low friction material, unwinding filament from the spool until the filament strand reaches a pair of motor-driven feed rollers at the extrusion head. Conversely, a series of feed rollers may be utilized and positioned beginning at the spool or source of filament, along a feed path and ultimately at the extrusion head to advance the strand of filament within the modeling machine. The force required to advance, drive, or feed the strand of filament can be substantial at times and require as much as approximately twenty pounds of push force.

The filament strand is ultimately advanced by the feed rollers into a liquifier carried by the extrusion head. Inside the liquifier, the filament is heated to a flowable temperature. As the feed rollers continue to advance filament into the extrusion head, the force of the incoming filament strand extrudes the flowable material out from the dispensing nozzle where it is deposited onto a substrate that is removably mounted to a build platform. The flow rate of the material extruded from the nozzle is a function of the rate at which the filament is advanced to the head and the size of the dispensing nozzle orifice. Pieces of contaminants may also exist in the liquifier and are extruded out of the nozzle along with the filament. Depending upon the size of the piece of contaminant, it may partially or completely plug the nozzle creating significant pressure peaks on the order of four to five times greater than the pressure level normally contained in the liquifier. The feed rollers have to be able to continue to drive the filament during these pressure peaks.

A controller controls movement of the extrusion head in a horizontal x, y plane, controls movement of the build platform in a vertical z-direction, and controls the rate at which the feed rollers advance filament into the head. By controlling these processing variables in synchrony, the modeling material is deposited at a desired flow rate in "beads" or "roads" layer-by-layer in areas defined from the CAD model. The dispensed modeling material solidifies upon cooling, to create a three-dimensional solid object.

In order for the controller to properly control the movement of the extrusion head to create the desired defined three-dimensional solid object, the feed rollers must consistently feed or drive the filament at a predetermined rate without filament slippage. Slippage of the filament in the feed rollers occurs when the filament fails to advance at the desired rate despite rotation of the feed rollers. Filament slippage creates a shortage of modeling material that is supplied to the extrusion head that in turn creates a shortage of modeling material to build the desired three-dimensional model at the defined time and location. This can result in an unsuccessful build of the three-dimensional model that may not be as structurally sound as the designed part or may be deformed due to the shortage of modeling material during the building process.

In an effort to prevent filament slippage, feed rollers have been manufactured out of urethane and mounted on fixed axles to compress against and advance or drive the strand of filament. However, time and varying diameters of strands of filament driven by the feed rollers cause wear on the urethane feed rollers which ultimately lead to an inability of the feed rollers to apply sufficient compression on the strand of filament for consistent advancement under varying conditions. In particular, as the required push force to advance the filament approaches twenty pounds of pressure, it often exceeds the amount of force that urethane feed rollers are able to apply to the filament resulting in the filament slipping and not advancing at the desired rate if even at all.

Thus, there exists a need to provide a drive mechanism to accommodate filaments with varying diameters while more effectively driving the feed rollers to advance the filament.

BRIEF SUMMARY OF THE INVENTION

The invention relates to a deposition modeling system that utilizes a drive mechanism to feed a strand of filament to create a model. The drive mechanism comprises a pivot block that is rotatably connected to a fixed block and a motor that rotates a drive shaft. A drive roller is connected to the drive shaft and an idler roller is connected to an idler axle that extends from the pivot block in a substantially perpendicular direction to the direction of rotation of the pivot block with respect to the fixed block and a parallel direction to the drive shaft. The drive roller further includes a channel around its outer circumferential surface that includes a series of teeth to drive the strand of filament.

BRIEF DESCRIPTION OF THE DRAWINGS

FIG. 6 is a cross-sectional top view with portions shown in full of section 6-6 of FIG. 2A.

FIG. 7 is an enlarged partial view of the cross-sectional top view of FIG. 6.

DETAILED DESCRIPTION

Figure 1:
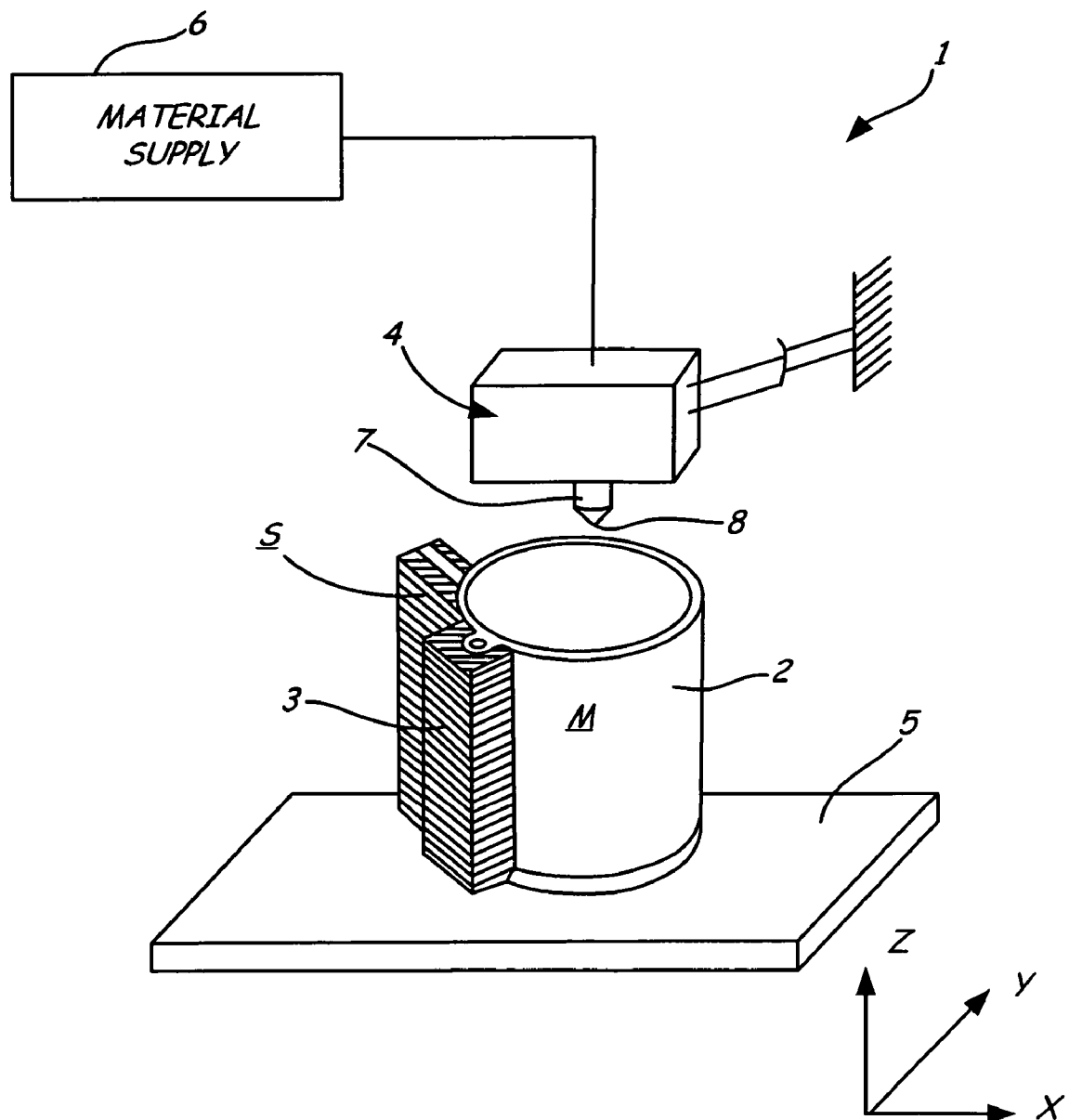
FIG. 1 is a diagrammatic illustration of a model and a support structure therefor formed using layered extrusion techniques.

The present invention is described with reference to a deposition modeling system of the type shown in FIG. 1. FIG. 1 shows an extrusion apparatus 1 building a model 2 supported by a support structure 3 according to the present invention. The extrusion apparatus 1 includes an extrusion head 4, a material-receiving base 5 and a material supply 6. The extrusion head 4 moves in X and Y directions with respect to the base 5, which moves in a vertical Z direction. The material supply 6 supplies a feedstock of material to the extrusion head 4. In the described embodiment, a solid feedstock of material is supplied to the extrusion head 4, and is melted in a liquifier 7 carried by the extrusion head 4. The liquifier 7 heats the feedstock material to a temperature slightly above its solidification point, reducing it to a molten state. Molten material is extruded through a nozzle 8 of the liquifier 7 onto the base 5.

The movement of the extrusion head 4 is controlled so as to deposit material onto the base 5 in multiple passes and layers to build the three-dimensional model 2 and further to build the support structure 3 defined so as to physically support the model 2 as it is being built. The model 2 and its support structure 3 are build up on the base 5 within a build chamber (not shown) having an environment controlled so as to promote thermal solidification. A first layer of the deposited material adheres to the base 5 so as to form a foundation, while subsequent layers of material adhere to one another.

A modeling material M is dispensed to form the model 2, and a support material S is dispensed in coordination with the dispensing of modeling material M to form the support structure 3. For convenience, the extrusion apparatus 1 is shown with only one material supply 6. It should be understood, however, that in the practice of the present invention, the modeling material M and the support material S are provided to the extrusion apparatus 1 as separate feedstocks of material from separate material supplies. The extrusion apparatus 1 may then accommodate the dispensing of two different materials by: (1) providing two extrusion heads 4, one supplied with modeling material M and one supplied with support material S (such as is disclosed in the Batchelder '561 patent); (2) providing a single extrusion head 4 supplied with both the modeling material M and the support material S, with a single nozzle 8 for dispensing both materials (such as is shown in FIG. 6 of the Crump '329 patent); or (3) providing a single extrusion head supplied with both materials, with each material dispensed through a separate nozzle 8 (such as shown in FIG. 6 of the Crump '785 patent).

In the described embodiment, the modeling material M and the support material S are deposited as substantially continuous "roads" in horizontal layers from an extrusion head 4, and are supplied to the extrusion head 4 in solid form. The present invention is directed toward improving the delivery of the feedstock provided by the material supply 6 to the extrusion head 4 in the extrusion apparatus 1.

Figure 2A:
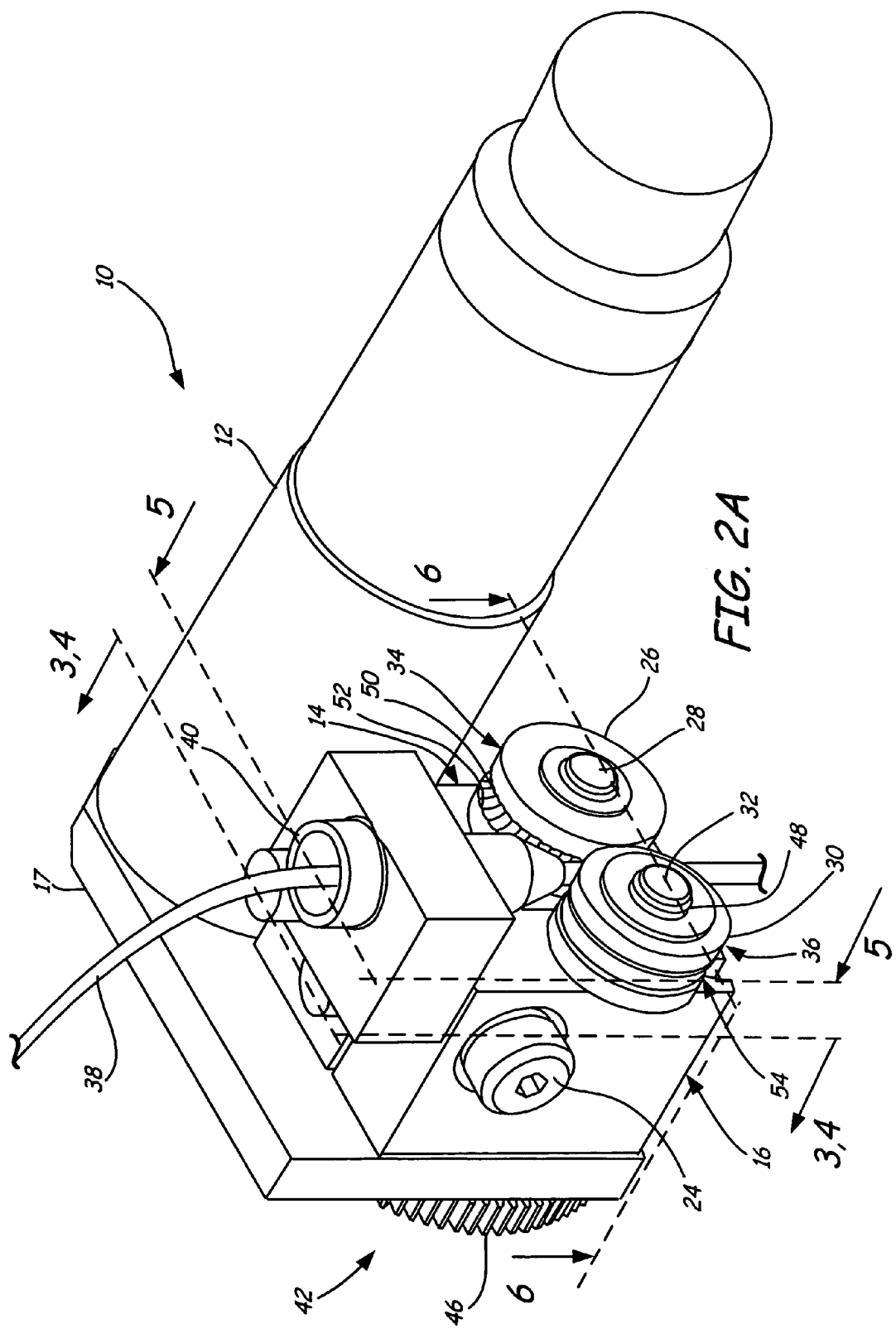
FIGS. 2A and 2B are an assembled perspective view and an exploded view, respectively, of an embodiment of the invention.
Figure 2B:
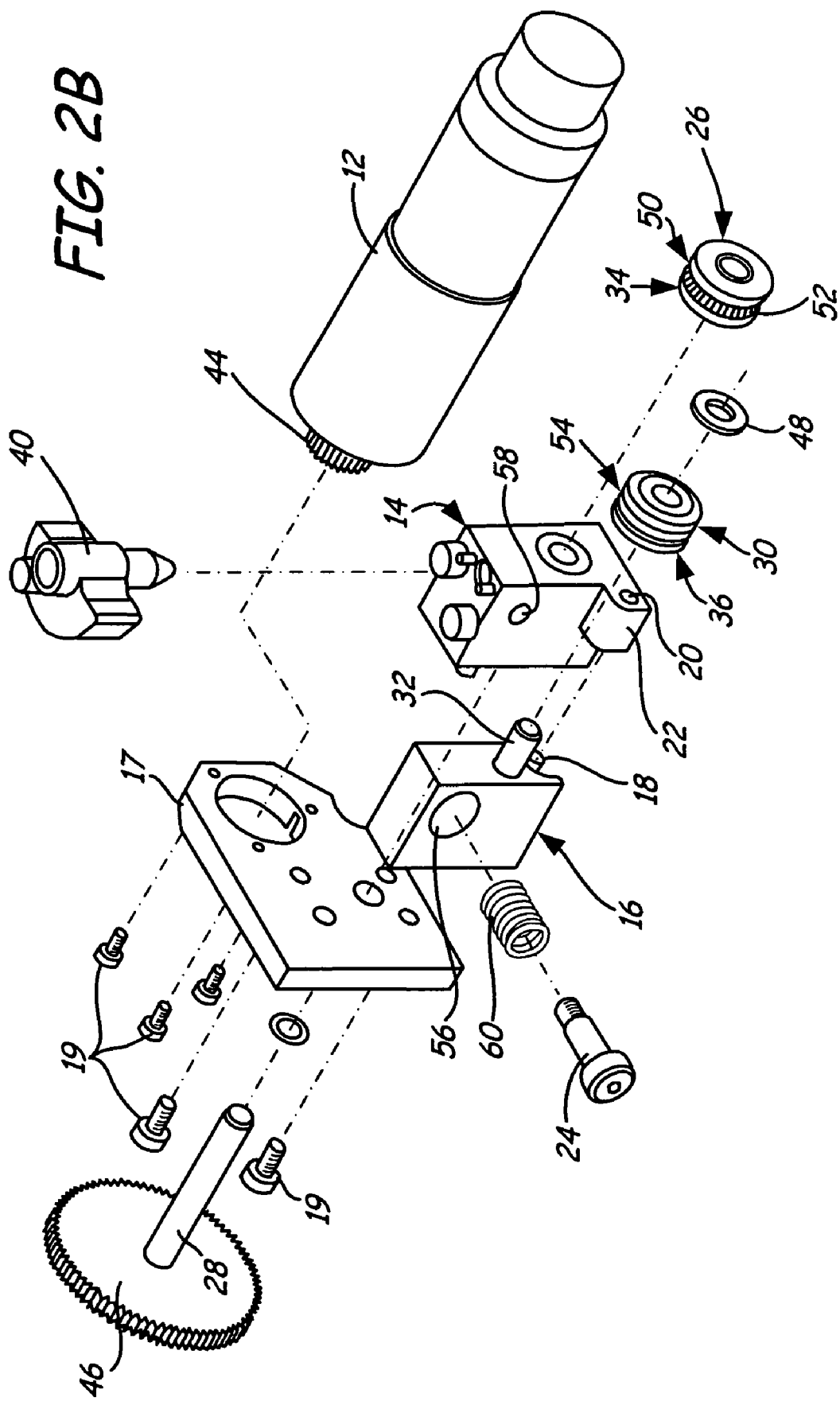

An embodiment of the drive mechanism 10 of the present invention is shown in FIGS. 2A and 2B. The drive mechanism 10 is carried by the extrusion head 4 of the extrusion apparatus 1 to receive and advance the feedstock of material provided by material supply 6. The drive mechanism 10 includes a motor 12, a fixed block 14, and a pivot block 16. The motor 12 and the fixed block 14 are secured to a motor mount plate 17 by a series of fasteners 19. The pivot block 16 is rotatably connected to the fixed block 14 by pivot axle 18 that is received in aperture 20 of member 22 that extends from fixed block 14. A fastener 24, such as a bolt, passes through the pivot block 16 and is secured to the fixed block 14. The fastener 24 passes through a through hole 56 in the pivot block 16 and is secured in a threaded bore 58 in the fixed block 14. The fastener 24 captures a spring 60 in the through hole 56.

The fixed block 14 includes a drive roller or wheel 26 that is mounted on a drive axle 28. The drive axle 28 extends from the fixed block 14 substantially parallel to aperture 20 that receives pivot axle 18. The drive roller 26 has an outer circumferential surface 34.

An idler roller or wheel 30 is mounted on an idler axle 32 that extends from the pivot block 16. The idler roller 30 includes an outer circumferential surface 36. The idler axle 32 is substantially parallel to the drive axle 28 and the pivot axle 18. The idler axle 32 is positioned in relation to the drive axle 28 so that the outer surface 36 of idler roller 30 is opposed to the outer surface 34 of drive roller 26.

A strand of filament 38 represents the feedstock of material provided by material supply 6. The strand of filament 38 is directed by a funnel 40 to be captured between the outer surfaces 34 and 36 of the drive roller 26 and idler roller 30, respectively. The funnel 40 can be secured to the fixed block 14 in order to direct the strand of filament 38 into a gap between the drive roller 26 and the idler roller 30. The strand of filament 38 is then directed by the drive roller 26 and the idler roller 30 to the liquifier 7 carried by the extrusion head 4 where it is heated into a molten state and extruded through the nozzle 8 to build the model 2.

A series of gears 42 enable the motor 12 to rotate the drive axle 28 to generate rotation of the drive roller 26. In an embodiment of the invention, the series of gears 42 include a drive gear 44 secured to the output drive shaft 46 of the motor 12. The drive gear 44 extends through the motor mount plate 17. The drive gear 44 is intermeshed with a driven gear 46. The drive axle 28 extends from the driven gear 46 to rotate the drive roller 26.

The drive axle 28 passes through an aperture in the motor mount plate 17 and the fixed block 14. A set of bearings or other alternative techniques known to those of skill in the art can be used as the interface between the drive axle 28 and the fixed block 14. The drive axle 28 extends out from the fixed block 14 to receive the drive roller 26 that is mounted thereon. The drive roller 26 can be secured to the drive axle 28 by any known technique to one of skill in the art, such as for example by press fitting.

The idler axle 32 extends from the pivot block 16 and allows the idler roller 30 to freely rotate. A retainer 48, such as a speed nut, can be used to secure the idler roller 30 onto the idler axle 32.

The outer surface 34 of the drive roller 26 preferably includes a channel 50. Within channel 50 are a series of teeth 52 that are created to contact the strand of filament 38 for advancement in the desired direction.

The outer surface 36 of the idler roller 30 can be constructed from 416cd stainless steel and may include a trough 54 that is aligned with and opposite the channel 50 of the drive roller 26.

In one embodiment, the motor 12 is a precision servo motor. However, those of skill in the art will recognize that alternative motors could also be used, such as a motor incorporating a rotary encoder. While the output drive shaft 45 of the motor 12 could be used as the drive axle 28, the embodiment of the drive mechanism 10 illustrated in FIGS. 2A and 2B utilize a series of gears 42 with the driven gear 46 larger than the drive gear 44. The larger driven gear 46 enables greater positive control over the amount of rotation on the drive axle 28 and hence greater control on the drive roller 26.

The outer surfaces 34 and 36 of the drive roller 26 and idler roller 30, respectively, form a nip to contact and compress or pinch against the strand of filament 38 to advance or drive the strand of filament 38 in a desired direction by rotation of the drive roller 26. Positioning the trough 54 opposite the channel 50 helps maintain contact and alignment of the filament 38 as it is compressed or pinched between the drive roller 26 and the idler roller 30. The trough also helps apply pressure against the strand of filament 38 on a side opposite to the series of teeth 52 in the channel 50. This pressure helps embed the strand of filament 38 into the series of teeth 52 for advancement of the strand of filament 38 in the desired direction.

Figure 3:
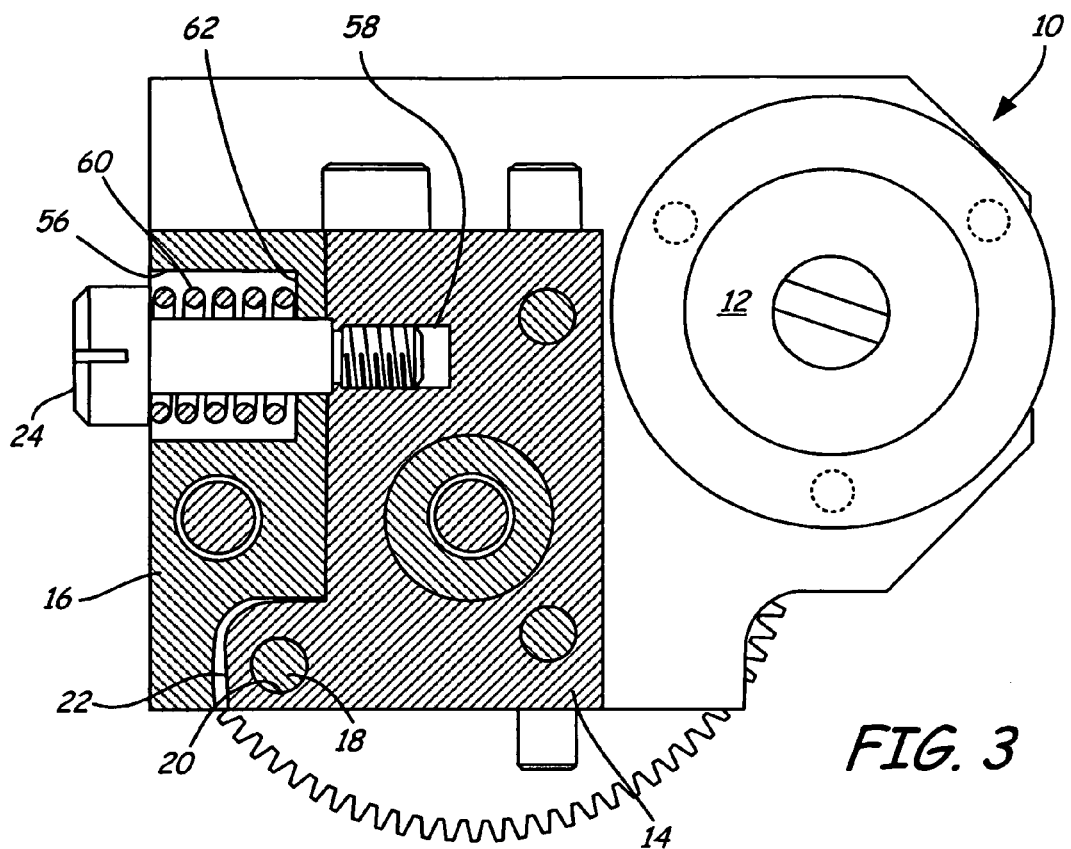
FIG. 3 is a front cross-sectional view of section 3-3 of FIG. 2A.
Figure 4:
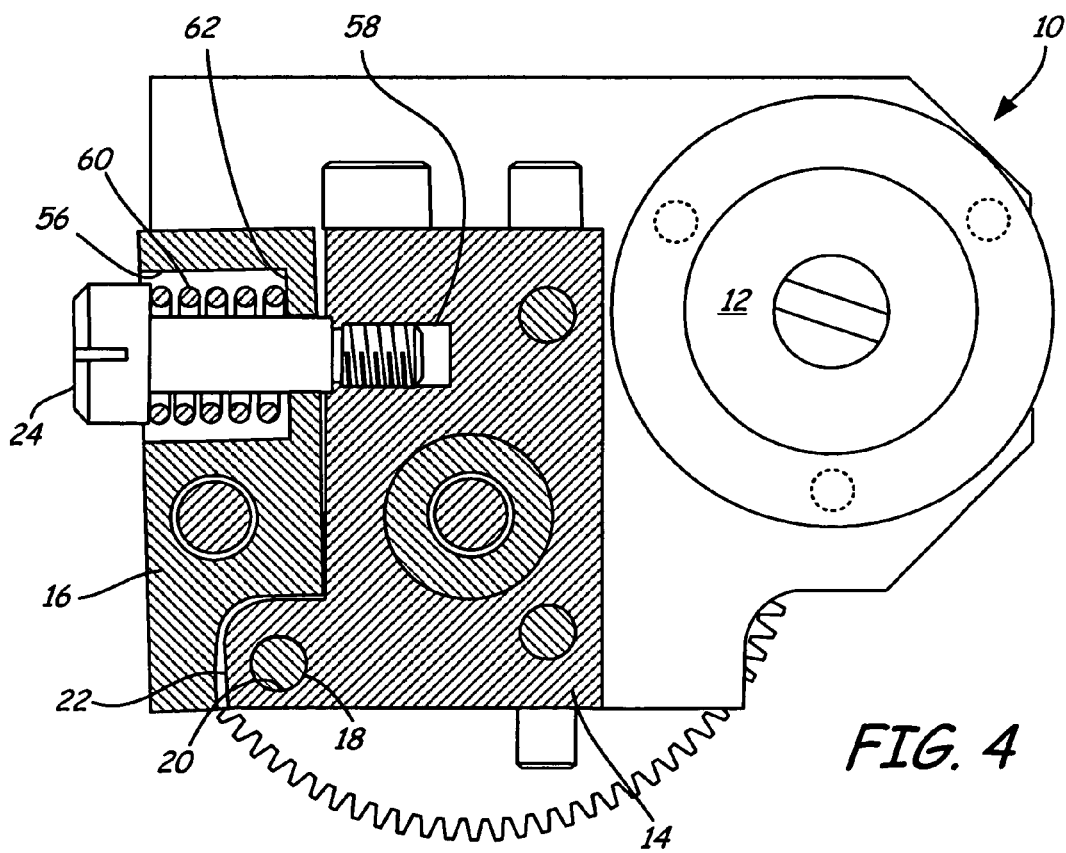
FIG. 4 is a front cross-sectional, partially broken view along of 4-4 of FIG. 2A.

FIGS. 3 and 4 illustrate the rotation of the pivot block 16 with respect to the fixed block 14. FIGS. 3 and 4 are front cut away views of the drive mechanism 10 along sections 3-3 and 4-4 of FIG. 2A. In FIG. 3, the pivot block 16 is illustrated in its biased position which is in contact with the fixed block 14. In this position, the distance between the drive roller 26 and the idler roller 30 is at its minimum. In FIG. 4, the pivot block 16 is rotated away from the fixed block 14 maximizing the distance between the drive roller 26 and the idler roller 30.

As illustrated in FIG. 3, the through hole 56 of pivot block 16 has a larger diameter on its outer edge and a smaller diameter along its inner edge that abuts with the fixed block 14 to create a shoulder 62. The inner diameter of the through hole 56 allows the fastener 24 to pass therethrough, however, the shoulder 62 contacts and captures the spring 60 between the shoulder 62 and the head of the fastener 24. Once the fastener 24 is secured into the threaded bore 58 of the fixed block 14, the spring 60 compresses against the shoulder 62 biasing the pivot block 16 against the fixed block 14. If the strand of filament 38 that passes between the drive roller 26 and the idler roller 30 is sufficiently large, it will automatically overcome the compressive force created by the spring 60 against the shoulder 62 and cause the pivot block 16 to rotate away from the fixed block 14 about pivot axle 18.

FIG. 4 illustrates the pivot block 16 being rotated away from the fixed block 14. While the pivot block 16 is rotated away from the fixed block 14, the spring 60 continues to apply pressure against the pivot block 16 and biases it against the fixed block 14. Biasing the pivot block 16 toward the fixed block 14 also biases the idler axle 32 and hence the idler roller 30 toward the drive axle 28 and drive roller 26, respectively. This results in the idler roller 30 applying continual pressure against the strand of filament 38 into the series of teeth 52 of the drive roller 26.

The distance between the drive roller 26 and idler roller 30 is increased as the pivot block 16 rotates away from the fixed block 14 because the pivot axle 18 is placed in a direction substantially parallel with the drive axle 28 and the idler axle 32. This results in the direction of rotation of the pivot block 16 about the pivot axle 18 being substantially perpendicular to the drive axle 28 and the idler axle 32. The fastener 24 secured to the fixed block 14 limits the amount of rotation of the pivot block 16 from the fixed block 14. The range of rotation for the pivot block 16 away from the fixed block 14 is between approximately 0° to 15° and thus allows for a range of diameter thickness for the spool of filament 38 of between approximately 0.040 to 0.100 inches. The range of diameters for the strand of filament 30 can be increased by allowing a greater amount of rotation of the idler axle 32 in relation to the pivot axle 18. This can be accomplished by use of a longer fastener 24 or moving the idler axle 32 further away from the pivot axle 18 or by other techniques known to those of skill in the art.

Figure 5:
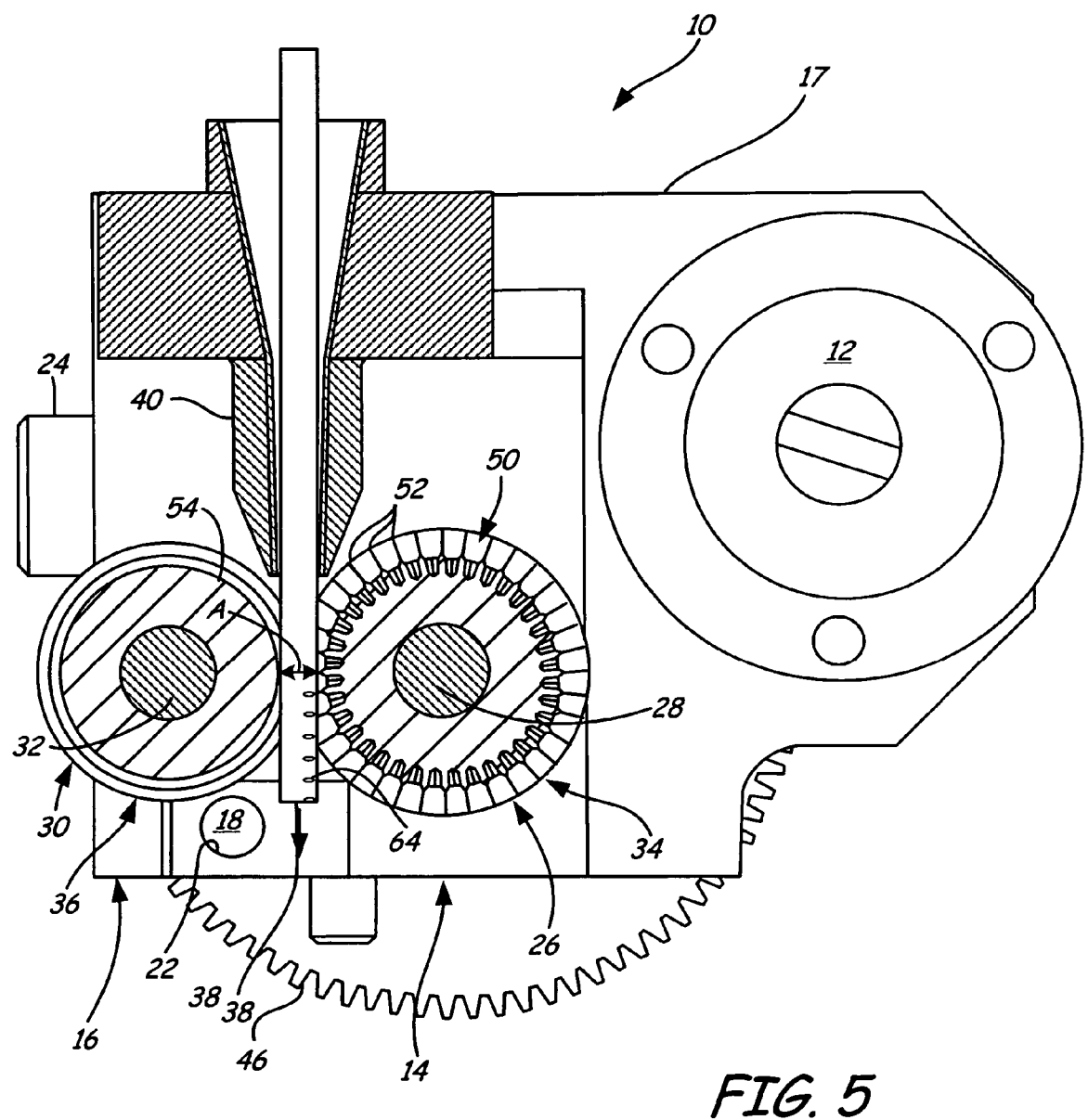
FIG. 5 is a front cross-sectional view of section 5-5 of FIG. 2A.

FIG. 5 is a front cut-away view of the drive mechanism 10 along section 5-5 of FIG. 2A. FIG. 5 highlights a gap A that forms the nip between the bottom of the channel 50 created by the series of teeth 52 and a bottom of the trough 54. In one embodiment of the invention, the width of the nip represented by gap A can vary between about 0.059 to 0.109 inches as pivot block 16 rotates away from the drive block 14. However, those of skill in the art will recognize that the nip represented by gap A can be adjusted as the range of rotation for pivot block 16 is adjusted in order to accommodate strands of filament 38 with different diameters. The stand of filament 38 passes through the gap A or nip as it is advanced by the drive roller 26 and idler roller 30. More specifically, as the strand of filament 38 is directed out of the funnel 40 it is captured or pinched between the series of teeth 52 in the channel 50 of the drive roller 26 and the trough 54 of the idler roller 30. The idler roller 30, while free to rotate, applies pressure to the strand of filament 38 on a side opposite the series of teeth 52 as it rotates about the idler axle 32. The idler roller 30 compresses the strand of filament 38 into the series of teeth 52 and allows the drive roller 26 to advance the strand of filament 38 in the desired direction. As a result of the compression of the idler roller 30 on the strand of filament 38, the series of teeth 52 can grip or bite into the opposite side of the filament 38 and control its advancement.

The series of teeth 52 contact and are partially embedded in the strand of filament 38. This is illustrated by tics 64 along the outer surface of the strand of filament 38. In one embodiment, the series of teeth 52 bite into or are embedded approximately 0.009 inches to create the tics 64 (in standard ABS modeling or build material manufactured by Stratasys, Inc.). In this embodiment, this results in a distance between where the series of teeth 52 contact the filament 38 and the trough 54 of approximately 0.031 to 0.091 inches for the typical range of filament diameters of between approximately 0.040 to 0.100 inches. However, those of ordinary skill in the art will recognize that the distance the series of teeth 52 bite or are embedded into the strand of filament 38 can be varied depending upon the type of filament, the hardness of the filament, the diameter of the filament, and the sharpness or height of the teeth 52.

The tics 64 represent the points of traction by the series of teeth 52 with the strand of filament 38. The series of teeth 52 provide a greater amount of traction with the strand of filament 38 than was previously obtained. The increase in traction between the strand of filament 38 and the series of teeth 52, allows the drive roller 26 to advance the strand of filament 38 with greater force and to substantially avoid instances of shaving or chipping away portions of the strand of filament 38. This has resulted in the filament drive mechanism 10 of the present invention being capable of consistently providing up to twenty-four pounds of push force to the strand of filament 38 without breaking or shaving the filament. As a result, the drive mechanism 10 is better able to control the delivery of the strand of filament 38.

FIG. 6 is a cross-sectional top view with portions shown in full of the drive mechanism 10 along a section 6-6 of FIG. 2A. As illustrated in FIG. 6, the strand of filament 38 is captured between the drive roller 26 and the idler roller 30. The idler roller 30 provides pressure against the strand of filament 38 to compress it against the series of teeth 52 located in the channel 50 of the drive roller 26.

FIG. 7 provides an enlarged view of the strand of filament 38 captured between the drive roller 26 and the idler roller 30. FIG. 7 illustrates that the series of teeth 52 bite into and contact the strand of filament 38 along line segments B. The minimal distance between the line segments B on opposite sides of the strand of filament 38 is preferably greater than approximately one-tenth of the diameter of the strand of filament 38. This distance is identified as distance D. Maintaining the minimal distance between the line segments B at approximately one-tenth of the diameter of the strand of filament 38 ensures that the strand of filament 38 contacts the series of teeth 52 on both sides and does not bottom out and contact the series of teeth 52 only along the bottom of the channel 50.

FIG. 7 also illustrates how the trough 54 of the idler roller 30 further aides in applying continual pressure against the strand of filament 38 seating it into the channel 50 as well as prevents the strand of filament 38 from slipping or sliding out of the channel 50.

Figure 8:
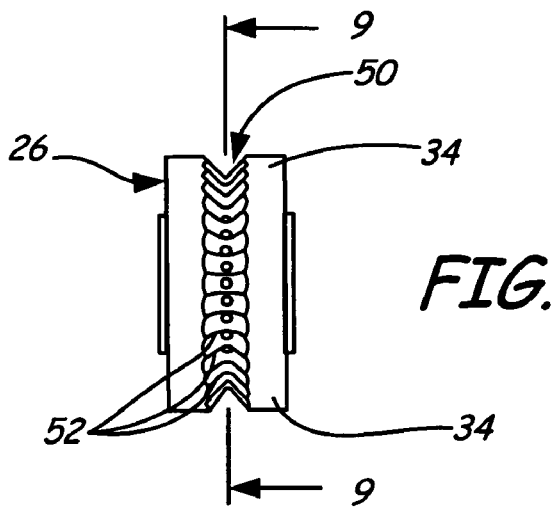
FIG. 8 is a side view of an embodiment of a drive roller of the invention.

FIG. 8 is a side view of the drive roller 26. The channel 50 is shown substantially centered along the outer circumference 34. The series of teeth 52 are created along the channel 50 resulting in a substantially V-shape. For increased durability, the roller is preferably made out of metal and constructed from 416cd stainless steel. In an embodiment of the invention, the drive roller 26 has a width along its outer surface 34 of approximately between 0.245 and 0.255 inches and preferably 0.250 inches, a channel width of approximately between 0.084 and 0.114 inches and preferably 0.089 inches, and a diameter of approximately 0.550 inches.

Figure 9:
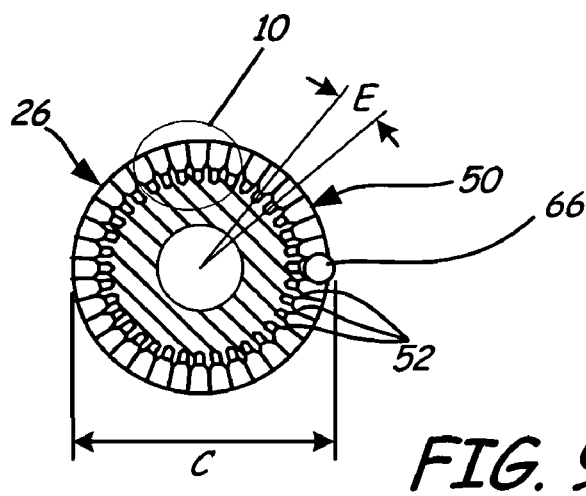
FIG. 9 is a front cross-sectional view of section 9-9 of FIG. 8.

FIG. 9 is a cross-sectional view of the drive roller 26 along section 9-9 of FIG. 8. As shown in FIG. 9, the channel 50 extends along the circumference of the drive roller 26. The series of teeth 52 are also more clearly illustrated along the circumference and particularly along the base of the channel 50. The depth of the channel 50 along with the speed that the drive roller 26 is rotated will together determine the rate that the strand of filament 38 is advanced and fed to the liquifier. The depth of the channel 50 can be measured either directly or indirectly. A technique used to ensure a consistent depth is created for channel 50 is by the use of a chrome steel ball 66 having a diameter of 0.0625±0.0001 inches that is set into the channel 50. The ball 66 rests in a pocket created by successive teeth 52 as illustrated in FIG. 9 to measure the distance C across the diameter of the drive roller 26 and the ball 66. The distance C should remain substantially constant for each pocket between each series of successive teeth 52 to maintain a predictable and constant rate of rotation for the drive roller 26. A constant rate of rotation for the drive roller 26 is important for controlling the feed rate of the strand of filament 38.

Figure 10:
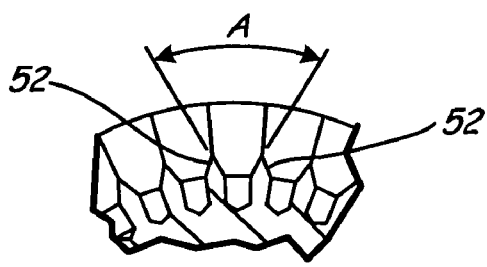
FIG. 10 is an enlarged partial view of the front cross-sectional view of FIG. 9.

FIG. 10 shows an enlarged view of a portion of the cross-sectional view illustrated in FIG. 9. As shown in FIG. 10, the series of teeth 52 are more prominently illustrated. The series of teeth 52 and the channel 40 can be created by various techniques known to one of skill in the art, such as for example, by use of a 3/0×60° center drill with an approximately 0.020 inch pilot drill tip. The series of teeth 52 are created by drilling along a radial line were successive radial lines form an angle E between approximately 8° and 15°. The series of teeth 52 are generated to create an angle A of approximately 60° between successive teeth. This angle, however, can be varied between the range of approximately 55° to 85° and still obtain the desired push force of approximately twenty pounds. The width and depth of the channel 50 is set to seat the strand of filament 38 within the channel 50 so that the series of teeth 52 along the sides of the channel 50, rather than its base, contact the strand of filament 38. The intersecting edges between successive teeth 52 are also generally not deburred to maintain a series of sharp teeth 52. The series of teeth 52 are thus able to bite into or grip the strand of filament 38 and obtain better traction to advance the filament 38 in the desired direction and with a greater amount of force without slippage, shaving, or breaking the strand of filament 38.

Figure 11:
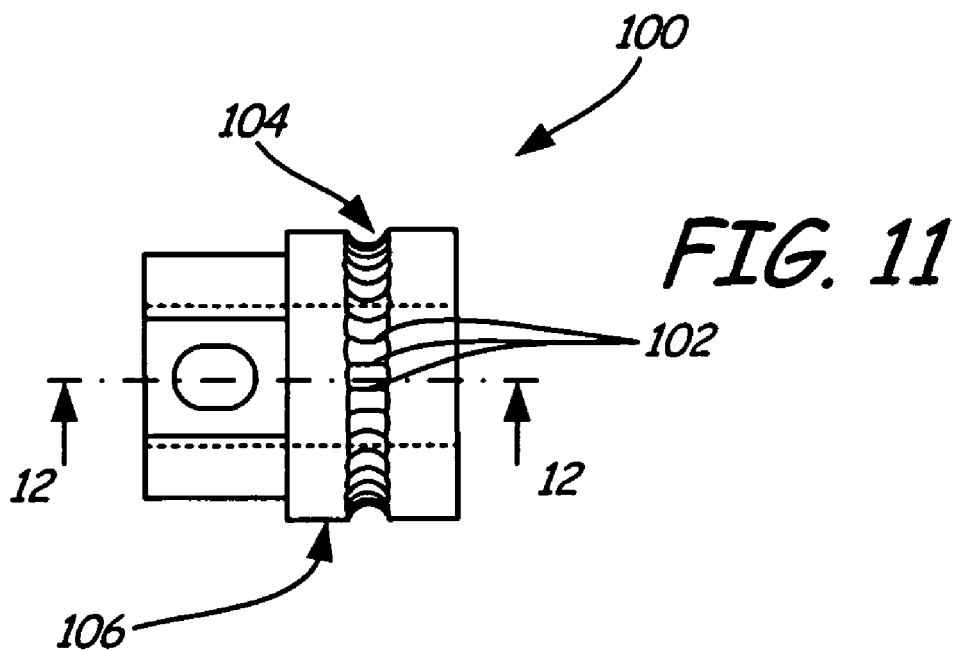
FIG. 11 is a side view of a prior art feed roller used in a prior art filament drive mechanism.
Figure 12:
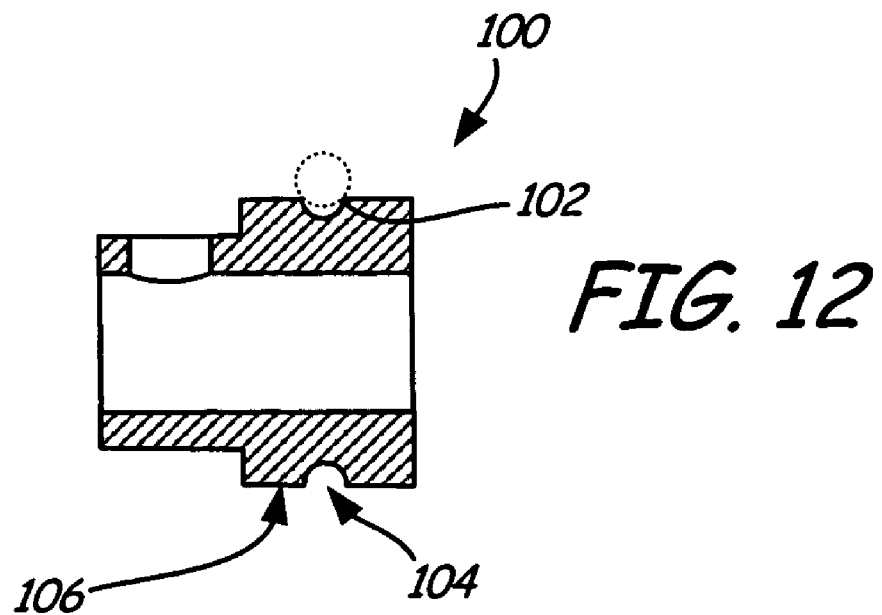
FIG. 12 is a cross-sectional view of section 12-12 of FIG. 11.

The profile of the series of teeth 52 that bite into the strand of filament 38 along the edges of the series of teeth 52 represents a significant improvement over the prior art tooth profile that is illustrated in FIGS. 11 and 12. FIG. 11 provides a side view of a toothed feed roller 100 that was attempted to overcome the wear and slippage issues associated with urethane feed rollers. The toothed feed roller 100 included a series of teeth 102 that were created along a channel 104 in an outer circumferential surface 106 of the feed roller 100.

FIG. 12 shows a cross-sectional bottom view along the section 12-12 of FIG. 11 of the toothed metal feed roller 100. A strand of filament 108 is shown in FIG. 12 in broken line. As can be seen in FIG. 12, the series of teeth 102 grab the strand of filament 108 along the outer edge of the individual teeth profile near the top of the channel 104 with minimal contact between the strand of filament 108 and the series of teeth 102. A pair of toothed feed rollers 100 as illustrated in FIGS. 11 and 12 were required to attempt and provide sufficient force to advance the strand of filament 108 as desired.

The series of teeth 102 tended to bite into the strand of filament 108 along their top edges near the top of the channel 104. This resulted in the series of teeth 102 tending to scrape off, chip away or shave filament as the strand of filament 108 passed through the pair of feed rollers 100. Filament slippage also tended to occur with the dual toothed feed rollers 100 as the push force required to continue to drive the strand of filament 108 approached eighteen pounds. Filament slippage also generally resulted in scraping off or shaving filament from the strand of filament 108. Filament pieces or shavings tend to cause undesirable filament buildup along the series of teeth 102 or near the extrusion head or other parts of the modeling machine. Filament buildup degrades or can potentially damage the modeling machine or adversely affect its performance.

The drive mechanism 10 is capable of receiving a greater range of diameters of filament, is more manufacturable and serviceable, as well as provides greater control and drive of the filament than the feed rollers 100 or other known prior art feed rollers. Although the present invention has been described with reference to preferred embodiments, workers skilled in the art will recognize that changes may be made in form and detail without departing from the spirit and scope of the invention. For example, the angle between successive teeth can be varied as well as the depth of the channel that the series of teeth are cut into or the depth of the trough. Additionally, the rollers or wheels can be made of alternative materials and anyone of skill in the art will recognize that the series of gears as well as the pivoting interconnection between the pivot block and fixed block can be achieved in a variety of ways.

The invention claimed is:

1. A drive mechanism for use in a deposition modeling system to receive a strand of filament and control the movement of the filament in a desired direction, the drive mechanism comprising:
   a fixed block having a bore extending within the fixed block;
   a pivot block rotatably connected to the fixed block and having a through hole that aligns with the bore of the fixed block;
   a fastener extending through the through hole of the pivot block and into the bore of the fixed block;
   a motor that rotates a drive shaft;
   a drive roller connected to the drive shaft;
   an idler axle that extends from the pivot block in a direction substantially perpendicular to the direction of rotation by the pivot block and parallel with the drive shaft; and
   an idler roller mounted on the idler axle such that the idler roller is free to rotate and its outer rim opposes an outer rim of the drive roller.

2. The drive mechanism of claim 1, wherein a series of gears connects the motor to the drive shaft enabling the motor to rotate the drive shaft.

3. The drive mechanism of claim 1, wherein the drive shaft extends through a second bore in the fixed block.

4. The drive mechanism of claim 3, wherein a bearing interfaces between the drive shaft and the second bore of the fixed block.

5. The drive mechanism of claim 1, wherein the motor rotates a drive gear whose teeth are intermeshed with a driven gear from which the drive shaft extends.

6. The drive mechanism of claim 5, wherein the driven gear is larger than the drive gear.

7. The drive mechanism of claim 1, wherein the motor is a precision servo motor.

8. The drive mechanism of claim 1, wherein the motor further comprises an encoder.

9. The drive mechanism of claim 1, and further comprising a second bore in the fixed block that is substantially parallel to the drive shaft to receive a pivot axle of the pivot block to rotatably connect the pivot block to the fixed block.

10. The drive mechanism of claim 9, wherein the second bore is in a member that extends from a sidewall opposed to the pivot block along a bottom of the fixed block.

11. The drive mechanism of claim 1, wherein the through hole of the pivot block runs substantially perpendicular to the drive shaft and the through hole has a first diameter that is greater than a second diameter to create a shoulder.

12. The drive mechanism of claim 11, wherein the bore of the fixed block comprises a threaded bore.

13. The drive mechanism of claim 12, wherein the fastener is secured in the threaded bore of the fixed block to capture a spring between the shoulder of the through hole and a top of the fastener.

14. The drive mechanism of claim 1, wherein the drive mechanism further includes a guide that directs the strand of filament between the drive roller and the idler roller.

15. The drive mechanism of claim 1, wherein the drive roller comprises:
   a roller having an aperture that defines an inner surface;
   an outer circumferential surface of the roller having a diameter that is greater than the inner surface;
   a pair of sidewalls between the inner surface and the outer surface;
   a channel along the outer surface between the pair of sidewalls, wherein the channel includes a series of teeth such that along a base of the channel successive teeth form an angle of between approximately 55° and 85°.

16. The drive mechanism of claim 15, wherein the outer surface has a width of between approximately 0.245 and 0.255 inches.

17. The drive mechanism of claim 15, wherein the channel has a width of approximately 0.084 and 0.114 inches.

18. The drive mechanism of claim 15, wherein the roller has a diameter of approximately 0.550 inches.

19. The drive mechanism of claim 15, wherein radial lines between successive teeth form an angle of between approximately 8° and 15°.

20. The drive mechanism of claim 1, wherein the drive roller comprises:

a roller having an aperture that defines an inner surface;

an outer circumferential surface of the roller having a diameter that is greater than the inner surface;

a pair of sidewalls between the inner surface and the outer surface;

a channel along the outer surface between the pair of sidewalls, wherein the channel includes a series of teeth that contacts the strand of filament on opposite sides of the filament such that the minimal distance between the points of contact on opposite sides of the filament is greater than one-tenth of the diameter of the strand of filament.

* * * * *